L. MAYER & E. A. BYE.
STEERING MECHANISM FOR TRACTORS.
APPLICATION FILED FEB. 23, 1916.

1,261,584.

Patented Apr. 2, 1918.

Inventor:
Louis Mayer and Edwin A Bye.
by: J S Bradbury
Attorney.

UNITED STATES PATENT OFFICE.

LOUIS MAYER AND EDWIN A. BYE, OF MANKATO, MINNESOTA, ASSIGNORS TO MAYER BROTHERS COMPANY, OF MANKATO, MINNESOTA, A CORPORATION OF MINNESOTA.

STEERING MECHANISM FOR TRACTORS.

1,261,584.   Specification of Letters Patent.   Patented Apr. 2, 1918.

Application filed February 23, 1916. Serial No. 80,033.

*To all whom it may concern:*

Be it known that we, LOUIS MAYER and EDWIN A. BYE, citizens of the United States, residing at Mankato, in the county of Blue Earth and State of Minnesota, have invented a new and useful Improvement in Steering Mechanism for Tractors, of which the following is a specification.

This invention relates to improvements in steering mechanism for self propelled vehicles, and more particularly pertains to improved means for steering farm tractors.

The primary object of this invention is to provide simple and inexpensive construction, which will effectively guide the front or steering wheels of the vehicle, and which can be operated from the rear end of the tractor.

To these ends our invention, comprises the features of construction and combination of parts hereinafter more particularly described and claimed.

Figure 1:
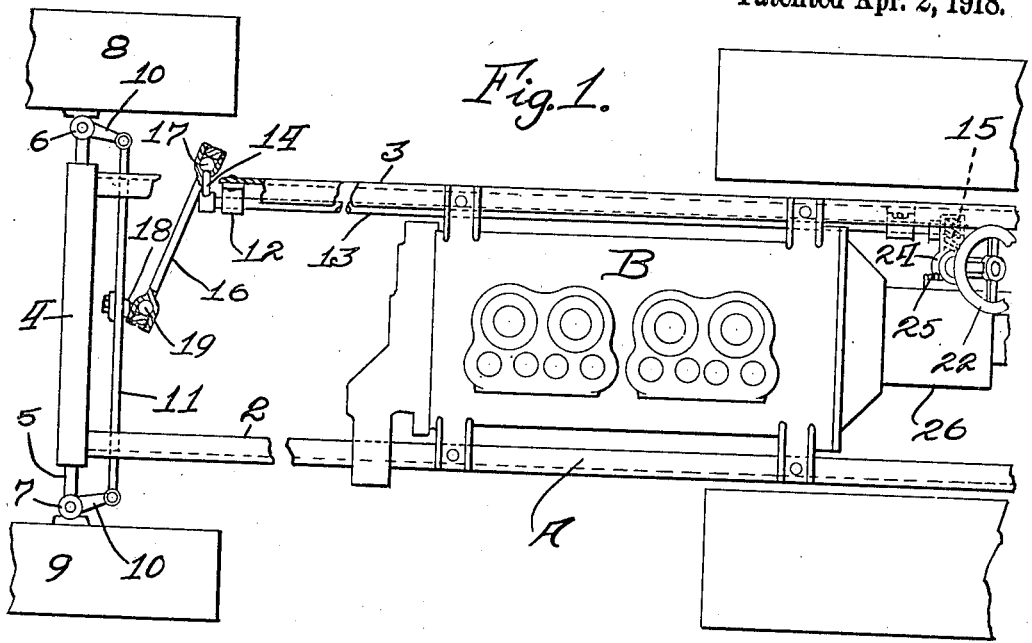
Figure 2:
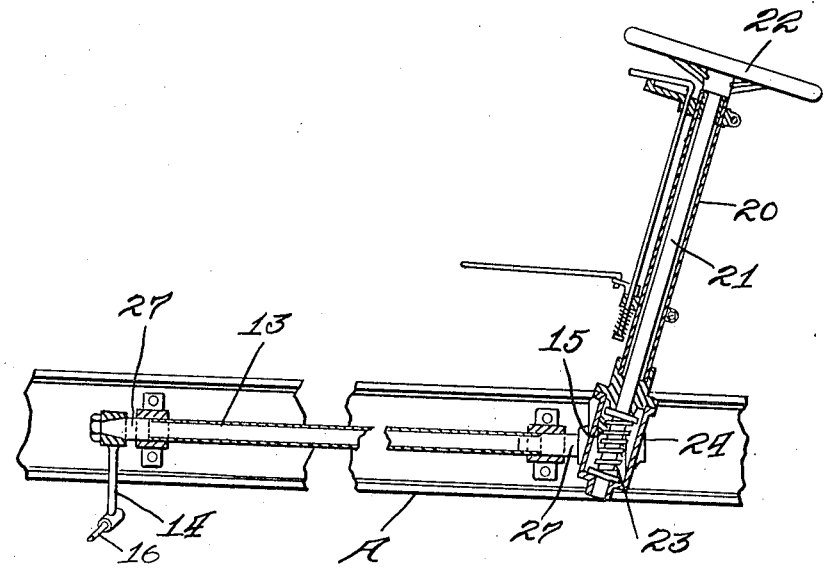

In the drawing, Figure 1 is a plan of the body of a tractor, portions thereof being broken away and in section, and Fig. 2 is a longitudinal section of a detail.

In the drawing, A is the frame or body of the vehicle having two side bars 2 and 3 of channel iron construction, upon which the frame of what we have chosen to term a unit power plant B is secured, and by which the side bars are held spaced apart. The forward end of the frame carries a pillar 4, which is secured to the side bars, and in which the axle 5 is carried. On the ends of this axle are swiveled the shaft bearing members 6 and 7, upon which the front wheels 8 and 9 are journaled in the usual manner. Extending rearwardly from the shaft bearing members are the usual steering arms 10, which are pivotally attached by their swinging ends to a connecting rod 11, whereby the wheels are guided in synchronism to steer the vehicle. Journaled in bearings 12, which are secured in the channel portion of one of the side bars such as 3 of the frame is a longitudinally extending shaft 13 on the forward end of which is a crank arm 14 and upon the rearward end a spiral gear 15. The crank arm is secured to one end of a link 16, by a universal joint 17, the opposite end of said link being connected to an arm 18 secured to the connecting arm 11 by another universal joint 19. By this means as the shaft 13 is turned, the connecting bar 11 is thrust or swung laterally, causing the wheels 8 and 9 to be guided in synchronism. Arranged adjacent the rearward end of the shaft 13 is a steering post 20 containing a vertical shaft 21 on the upper end of which is mounted a steering wheel 22. The lower end of the shaft 21 carries a spiral pinion 23, the teeth of which mesh with the teeth of the spiral gear 15, so that when the steering wheel 22 is turned, the shaft 13 is also turned. The lower end of the casing of the steering post is mounted upon a housing 24 containing the gear 15 and pinion 23, said housing being secured such as by bolts 25 to the side of the casing 26 of the unit power plant and the shaft 21 being journaled in the lower end of said housing. By this construction the steering post is mounted upon the unit power plant and by steering the wheel 22, the wheels 8 and 9 are guided in synchronism. The longitudinal shaft 13 is preferably in the form of a tube secured to solid extensions 27 at its ends, to which the gear arm 14 and spiral gear 15 are fastened. By combining the longitudinal shaft 13, unit power plant frame A and steering post mechanism, together, a rigid and strong structure is produced, which is not liable to easily get out of order after rough use to which a farm tractor is of necessity subjected.

By arranging the longitudinal shaft in the channel of the channel bar 3, it is placed out of the way of the working parts of the machine and secreted where there is little likelihood of any obstructions occurring. The unit power plant is composed of the usual prime mover, transmission and differential mechanisms and the brake not shown inclosed within a single casing.

In accordance with the patent statutes, we have described the principles of operation of our invention, together with the apparatus which we now consider to represent the best embodiment thereof, but we desire to have it understood that the construction shown in only illustrative, and that the invention can be carried out by other means and applied to uses other than those above set forth within the scope of the following claims.

Having described our invention what we claim as new and desire to protect by Letters Patent is:

1. In combination with a vehicle body frame having a longitudinal channel side bar, steering wheels swiveled upon the forward portion of said frame, a connecting element between said wheels for guiding them in synchronism, a longitudinal shaft journaled in the channel of said channel bar, and extending from the forward to the rearward end of said frame, means connecting the forward end of said shaft with said connecting element for transmitting a steering movement to said wheels when said shaft is turned, a support mounted upon said channel bar and means near the rearward end of said frame carried by said support for turning said shaft to effect the steering of said wheels.

2. In combination with a vehicle body frame having a longitudinal channel bar, steering wheels swiveled upon the forward portion of said frame, a connecting element between said wheels for guiding them in synchronism, a shaft movably secreted longitudinally in said channel bar and extending from the forward to the rearward portion of said frame, means connecting the forward end of said shaft with said connecting element for transmitting a steering movement to said wheels when said shaft is moved, and means connected to the rearward end of said shaft to effect its movement and the steering of said wheels.

In testimony whereof, we have signed our names to this specification.

LOUIS MAYER.
EDWIN A. BYE.